Feb. 1, 1949.　　　W. E. JACOBSEN　　　2,460,752
DYNAMOELECTRIC MACHINE

Filed Sept. 9, 1947　　　3 Sheets-Sheet 1

Inventor:
William E. Jacobsen,
by Prowell & Mack
His Attorney.

Feb. 1, 1949.  W. E. JACOBSEN  2,460,752

DYNAMOELECTRIC MACHINE

Filed Sept. 9, 1947  3 Sheets-Sheet 3

Inventor:
William E. Jacobsen,
by Marcell F. Mark
His Attorney.

Patented Feb. 1, 1949

2,460,752

UNITED STATES PATENT OFFICE 2,460,752

DYNAMOELECTRIC MACHINE

William E. Jacobsen, Ballston Lake, N. Y., assignor to General Electric Company, a corporation of New York Application September 9, 1947, Serial No. 772,986

9 Claims. (Cl. 171—252)

This invention relates to dynamoelectric machines and more particularly to ventilation arrangements for dynamoelectric machines employing a collector comprising a commutator, or slip rings, and associated brushes.

In a dynamoelectric machine employing such a collector system, located within the main machine housing, there is a problem of cooling the collector and at the same time assuring that carbon dust from the brushes will not be blown in upon the stator and rotor windings. There is the further problem of cooling the collector and at the same time assuring that ventilating medium previously heated by contact with the windings will not contact the parts of the collector system so as to add heat to these parts. Then, too, it is often desirable to use insulating compounds in the winding assemblies which would adversely affect commutation of the machine if the same air, or other cooling medium, were used to cool both the windings and the collector system.

It is an object of my invention to provide simple means for overcoming these difficulties.

It is a further object of my invention to provide an improved construction which results in a generally more satisfactory operation of a machine of the type described.

Broadly the means employed in the embodiments herein illustrated and described comprise a dynamoelectric machine having two impellers rotatable with the rotatable portion of the machine, the two impellers discharging ventilating medium into separate and independent parts of the machine so that there is no mixing of ventilating medium which cools the commutator with ventilating medium which cools the remainder of the machine. Other aspects of the invention will appear from consideration of the following description taken in connection with the accompanying drawing.

Figure 1:
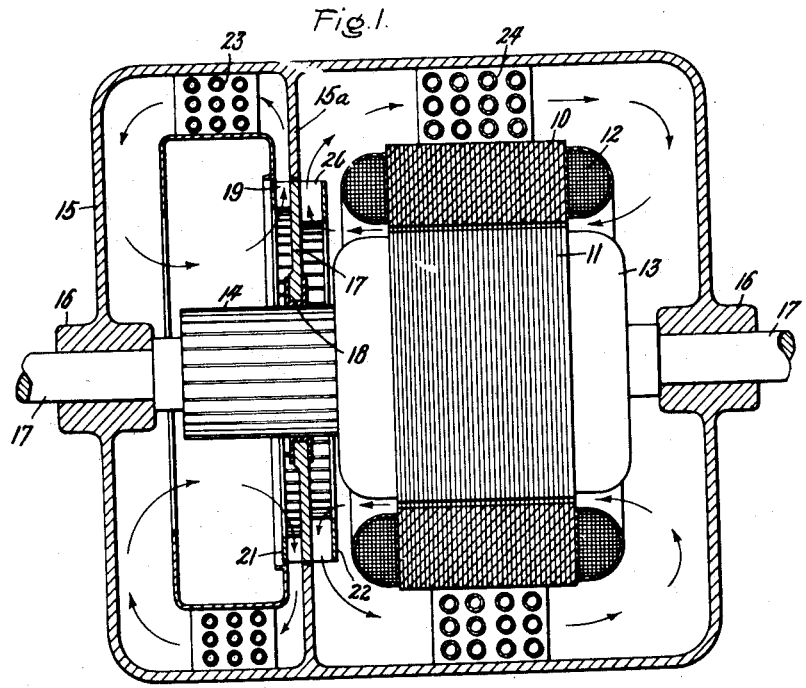
Figure 3:
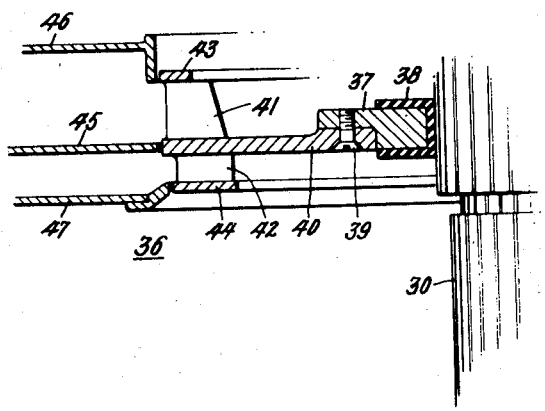
Figure 2:
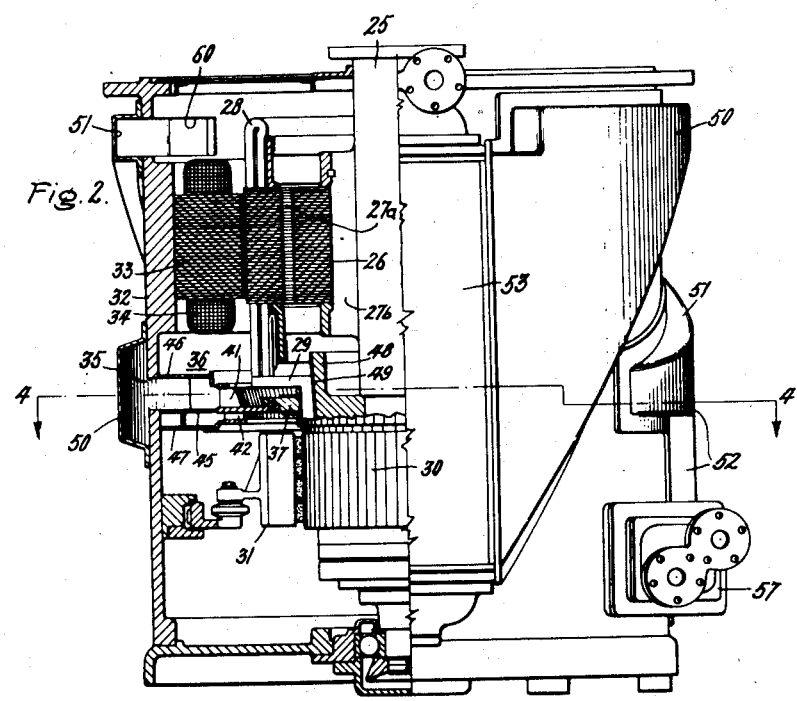
Figure 4:
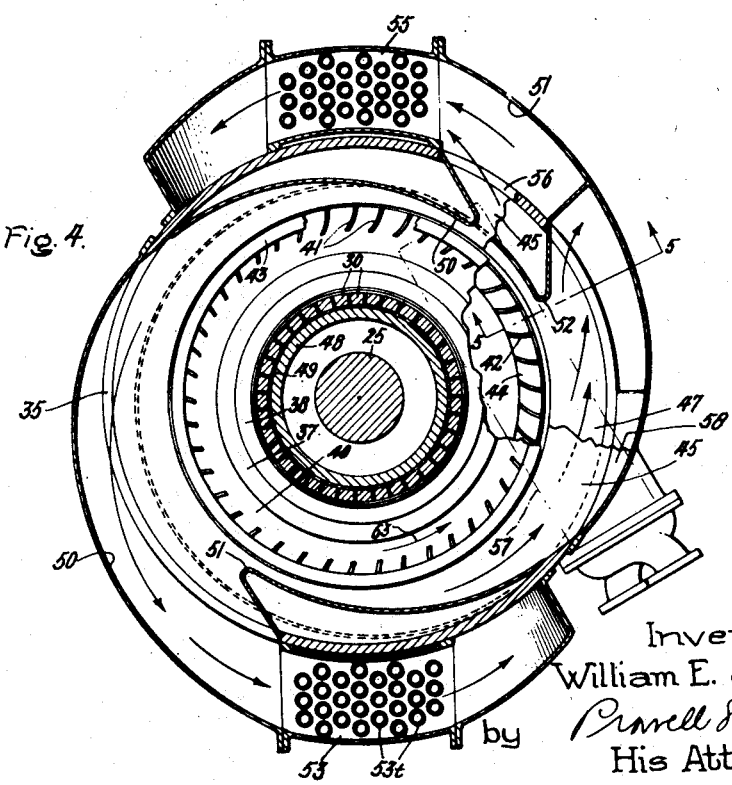
Figure 5:
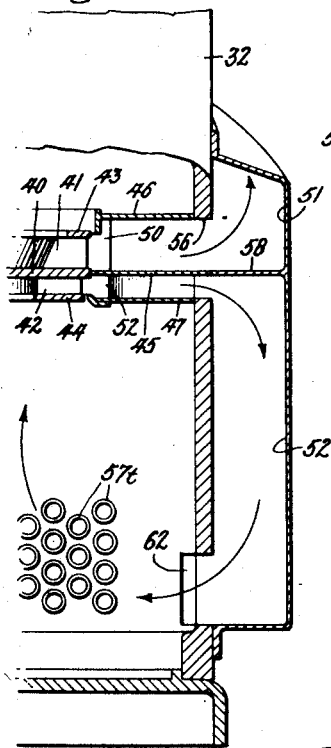
Figure 6:
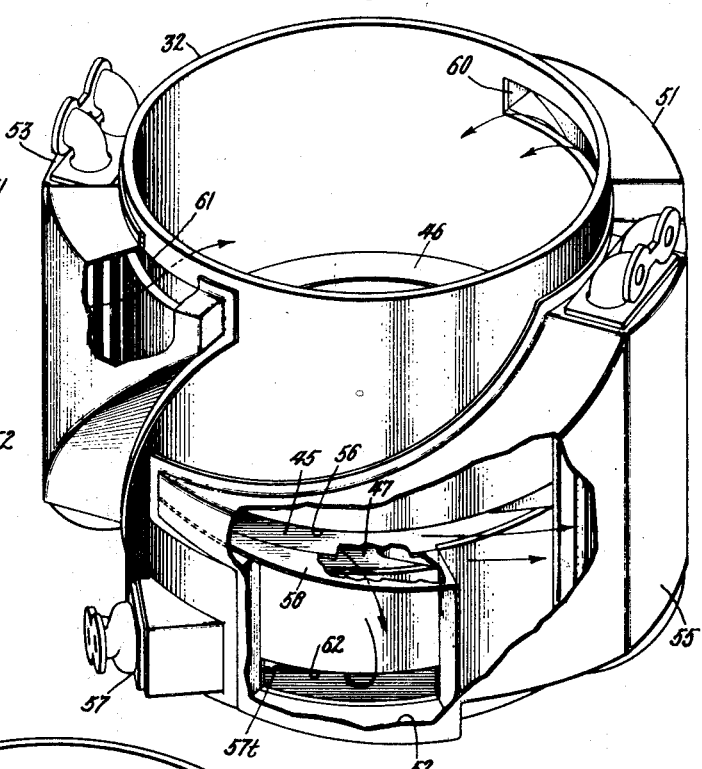
Figure 7:
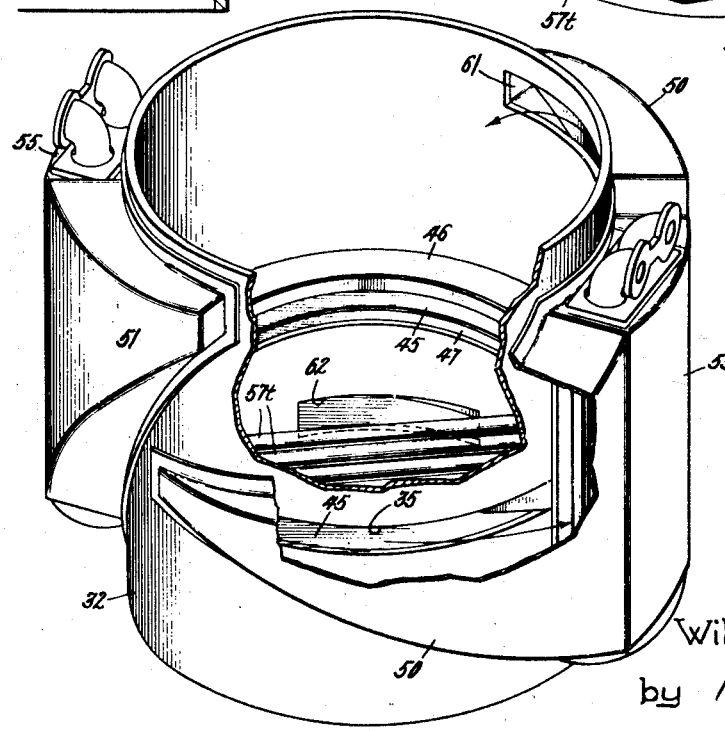

In the drawing, Fig. 1 illustrates a dynamoelectric machine and its associated equipment providing an embodiment of my improved ventilating system, Fig. 2 is a side elevational view, partly in section, of a dynamoelectric machine showing another embodiment of the invention, Fig. 3 is a detail of parts associated with the impeller blades shown in Fig. 2, Fig. 4 is a cross-sectional view taken on the line 4—4 of Fig. 2, Fig. 5 is a cross-sectional view taken on the line 5—5 of Fig. 4, Fig. 6 is a perspective view of the assembly of cooling scrolls of Figs. 2 and 4 as viewed generally radially inward along the line 5—5 of Fig. 4, and Fig. 7 is a perspective view of the assembly of the cooling scrolls from a somewhat opposite vantage point.

The drawings all refer to dynamoelectric machines of the commutator type which are adapted to be cooled by two substantially closed ventilating systems. In Fig. 1 the illustrated dynamoelectric machine is provided with a stationary member including a laminated stator core portion 10 and a rotatable member including a laminated rotor core portion 11. The stator core portion is provided with a winding 12. The rotor core portion is provided with a winding 13 which has an associated commutator 14. It will be understood that commutating brushes, not shown, are used to contact said commutator in conventional manner. The machine is provided with an outer housing 15 which provides bearing housings 16 for the machine shaft 17. Outer housing 15 is provided with an annular flange 15a which extends radially inward to separate the machine into two cooling compartments. A running seal is provided between the inner periphery of this flange 15a and the outer periphery of an annular fan-supporting-spider, or diaphragm, 17. Diaphragm 17 is solidly attached to the rotatable member of the machine, being attached to the commutator 14, but nevertheless insulated therefrom by a sheet of insulation 18 which electrically separates the commutator and the diaphragm and also extends a short distance radially outward along the two faces of the diaphragm to provide creepage insulation. A plurality of impeller blades 19 are attached to one side of diaphragm or spider 17 and a plurality of impeller blades 20 are attached to the other side of said spider. Impeller blades 20 which handle the ventilating medium used to cool the stator and rotor portions are of larger size than the impeller blades 19 which handle the relatively small amount of ventilating medium used to cool the commutator. An annular shroud ring 21 is provided for the small impeller blades 19 and an annular ring 22 is provided for the large impeller blades 20. These rings are open at the center to provide a large space between themselves and the commutator through which ventilating medium passes to enter the respective impeller blades. An annular cooler 23 is provided to cool the ventilating medium discharged by impeller blades 19, and an annular cooler 24 is provided to cool the ventilating medium discharged by the impeller blades 20.

In operation impeller blades 19 discharge ventilating medium through the cooler 23 back to the commutator, and meanwhile impeller blades 20 discharge ventilating medium through the cooler 24 to the rotor and stator core portions (and their windings) as shown by the directional arrows in Fig. 1.

If the insulation used in the stator and rotor windings has a binder of organo-silicon resin likely at operating temperatures to produce silicon vapors injurious to commutation, the problem thereby presented is likely to be of more consequence than the danger of brush dust adversely affecting the windings, and, therefore, it may be desirable to design the respective impeller blades so that a higher pressure is maintained at the output of the commutator-end impeller blades 19 than at the output of the impeller blades 20. Thus any leakage through the running seal will be away from the commutator. As an alternative, an air leak may be provided between the commutator impeller discharge and intake to cause a build up of pressure throughout the ventilating medium flow at the commutator end, assuring that any leakage will be away from the commutator end of the machine.

The machine shown in Fig. 1 is a rudimentary machine depicted for purposes of simplification. I have actually embodied my invention in a dynamoelectric machine of the type shown in the remaining figures of the drawing in which Fig. 2 is an elevational view, partly in section, of a vertical-type direct current generator adapted to be driven at its upper end by an external source of mechanical power, not shown. The generator has a shaft 25, and a rotor core portion 26 rotatable with said shaft and provided with axially extending cooling passages 27a and 27b. Rotor core portion 26 is also provided with a rotor winding 28. This winding is attached at one end to risers 29 which connect with the individual commutator segments 30. A plurality of brushes held by brush holders such as 31 are used to conduct the generated current away from the machine. The generator also has a stationary portion comprising an outer frame 32 and, attached thereto, a stator magnetic core portion 33 provided with a winding 34. The machine is also provided with a discontinuous outer wrapping which includes scrolls and coolers described with more particularity in connection with Figs. 4, 5, 6, and 7. Rotatable with the commutator of the machine is a dual impeller assembly 36 which is described in more detail in connection with Fig. 3 but which is similar in operation to the dual impeller assembly of Fig. 1.

In Fig. 3 I have shown a detail of the dual impeller assembly 36 attached to the individual segments 30 of the commutator of the machine shown in Fig. 2. The attachment is made by means of a shrink ring 37 which is shrunk onto the commutator altho separated therefrom by an insulating member 38 which separates these two members and extends radially upward around the faces of the shrink ring to provide creepage insulation. A plurality of machine screws 39 are used to attach a fan spider 40 to the shrink ring 37. Impeller blades 41, used to circulate ventilating medium around the magnetic cores and windings of the machine, are located on one side of the spider and the relatively small impeller blades 42, used to circulate ventilating medium around the commutator, are affixed to the other side of the spider. Blades 41 are held in place at their outer ends by a shroud ring 43 and blades 42 are held in place by a shroud ring 44. A stationary baffle 45 separates the discharges from the two impellers by providing a running seal with spider 40 of the above-described rotating assembly. There is also provided an additional baffle 46 adapted to direct the discharge of the large impeller and an additional baffle member 47 adapted to direct the discharge of the small impeller. All three baffles are annular in shape, extending around the entire periphery of the impeller assembly.

In Fig. 4 I have shown a cross-sectional view of the machine taken on the line 4—4 of Fig. 2. At the center of Fig. 4 is shown the circular shaft 25 surrounded by a commutator retaining member 48 with insulation 49 separating said member from the individual commutator segments 30. The impeller blades 41 are shown with their shroud ring 43, and, in the cut-away portion, the impeller blades 42 are shown with their shroud ring 44. Two fan scrolls 50 and 51 are provided for the discharge from the large impeller blades 41 and a single fan scroll 52 is provided for the discharge from the small impeller blades 42. The scroll 50 conducts ventilating medium to the cooler unit 53 comprising tubes 53t arranged to receive a coolant such as water. Scroll 51 leads to a similar, but oppositely located, cooler unit 55. The discharge of ventilating medium (from the larger impeller blades 41 and within the scrolls 50 and 51) through the frame 32 is not continuous around the entire periphery of the machine, but occurs at oppositely disposed slotted passages, 35 (for scroll 50) and 56 (for scroll 51). Scroll 52 conducts ventilating medium discharged by the small impeller 42 around the machine and eventually through the cooler unit 57 as more clearly shown in Figs. 5, 6, and 7. Direction of normal rotation is indicated by arrow 63 in Fig. 4.

In Fig. 5 I have shown a cross-sectional view taken on the line 5—5 of Fig. 4 and showing a cross section of scroll 51 (one of the two scrolls adapted to handle the discharge of the large impeller blades 41) and immediately therebelow a cross section of scroll 52 (adapted to handle the discharge of the small impeller blades 42). Scroll 52 not only leads around the machine but downward so that cooling medium is directed inwardly through slot 62 towards the tubes 57t of the cooler 57.

In Fig. 6 I have shown a perspective view of the cooling assembly attached to frame 32. It is seen from Figs. 5 and 6 that a single outer wrapping provides scroll 51 and scroll 52 the two being separated by a barrier 58. The circumferentially extending slot 56 provides passage through the frame 32 through which ventilating medium in scroll 51 may pass on its way to the cooler 55 after which it is carried by a continuation of scroll 51 to discharge through a slot 60 at the upper end of the machine to again be available to recirculate through the air gap and the rotor cooling passages to cool the core portions and their windings. Meanwhile a parallel path is provided through scroll 50 and through the cooler 53 and into the oppositely disposed slot 61 at the top of the machine. Scroll 52 is used to conduct the discharge from the smaller impeller blades 42 around the machine and then downward and then radially inward through a slot 62 towards the cooler 57 and from there back across the commutator and brushes to cool those parts of the machine.

In Fig. 7 I have shown a perspective view taken from a somewhat opposite vantage point so that cooler 55 is at the left and cooler 53 at the right. The other parts are numbered as in the other figures. In Figs. 4, 5, 6, and 7 a few directional arrows have been added to show the direction of flow of ventilating medium through the scrolls when the generator is completely assembled and operating.

Thus in a device of the character described I have provided ventilating medium for the windings which contains no matter foreign to the windings, and ventilating medium for the commutator which contains no matter foreign to the commutator and I have done this without the use of filters which would need to be periodically cleaned or replaced.

With the generator in operation two separate ventilating medium paths are provided. If it be assumed that the ventilating medium is air, the windings are provided with ventilating air that has not been heated or contaminated by passage around the commutator and brushes, and the commutator is provided with ventilating air which has not been heated or contaminated by prior passage through the stator or rotor windings. The latter feature is particularly advantageous when design considerations make it necessary to use high temperature organo-silicon resin varnishes, since difficulty with commutation performance and rapid rates of brush wear have often been traced to contamination of the ventilating air by passage of that air over hot silicon insulated windings.

The arrangement of scrolls shown in Figs. 2–7 aid in efficiently directing the two ventilating medium paths through their respective coolers and back to the points of entry into the interior of the machine with minimum loss of air pressure in changing the direction of flow. Thus heat is readily dissipated without material increase in size or weight of the machine and substantial savings can be obtained due to the higher rating which may be given to the same size machine.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. In a dynamoelectric machine having a stator core portion with a winding and a rotor core portion with a winding and a cooperating commutator, a substantially closed ventilating system for said core portions and said windings, a separate substantially closed ventilating system for said commutator, each of said ventilating systems comprising an assembly of impeller blades rotatable with the rotatable portions of said machine, and means for cooling ventilating medium in each of said ventilating systems.

2. A dynamoelectric machine having a stationary member provided with a winding and a rotatable member provided with a winding and a commutator connected to said winding, means including ventilating medium impeller blades rotatable with said commutator for directing ventilating medium flow over said commutator, means including ventilating medium impeller blades rotatable with said commutator for directing ventilating flow over said windings, means including a baffle for separating ventilating medium flow caused by said first-mentioned impeller blades from ventilating medium flow caused by said second-mentioned impeller blades, whereby there will be no intermixing of ventilating medium used to cool said commutator with ventilating medium used to cool said windings.

3. A dynamoelectric machine having a stationary member and a rotatable member provided with a winding and a commutator, means including ventilating medium impeller blades rotatable with said commutator for directing ventilating medium flow over said commutator, means including ventilating medium impeller blades rotatable with said commutator for directing ventilating flow over said winding, means including a baffle for separating ventilating medium flow caused by said first-mentioned impeller blades from ventilating medium flow caused by said second-mentioned impeller blades, whereby there will be no intermixing of ventilating medium used to cool said commutator with ventilating medium used to cool said winding.

4. A dynamoelectric machine having a stationary member provided with a winding and a rotatable member provided with a winding and a commutator connected thereto, said windings being provided with organo silicon resin insulation, means including ventilating medium impeller blades rotatable with said commutator for directing ventilating medium flow over said commutator, means including ventilating medium impeller blades rotatable with said commutator for directing ventilating medium flow over said windings, means including a baffle for separating the ventilating medium flow caused by said first-mentioned impeller blades from the ventilating medium flow caused by said second-mentioned impeller blades, and means for causing a higher operating pressure throughout the flow of ventilating medium for said commutator than throughout the flow of ventilating medium for said windings.

5. A dynamoelectric machine having a stator core portion with a winding and a rotor core portion with a winding and a cooperating commutator, impeller blades rotatable with said commutator and adapted to provide a flow of ventilating medium over said commutator, cooling means for said ventilating medium flow, means including a scroll for directing said ventilating medium flow to and away from said cooling means, means including impeller blades rotatable with said commutator for directing a separate flow of cooling medium over said stator and rotor windings, cooling means for said separate flow of ventilating medium, and means including at least one scroll for directing said separate flow of cooling medium over said windings and to and away from said cooling means.

6. A dynamoelectric machine having a stationary frame, a stator core portion attached to said frame, a stator winding arranged about said stator core portion, a rotatable shaft, a rotor core portion rotatable with said shaft, a winding in said rotor core portion, a commutator rotatable with said shaft and attached to said rotor winding, commutator brushes, an enclosure for all of said machine, means including a dual impeller assembly rotatable with said shaft and for providing two distinct ventilating medium flows, means including barriers for separating said ventilating medium flows and confining one of said flows to the commutator end of said machine and the other of said flows to the end of said machine containing said windings, means including a scroll arranged generally around the periphery of said machine and leading from the inner to the outer side of said frame and adapted to direct said commutator end flow from the associated half of said dual impeller assembly through a cooling means and back to said commutator, and means including two scrolls arranged around the periphery of said machine and extending from the inside to the outside of said frame to direct flow from the other half of said dual impeller assembly through cooling means and back to said stator and rotor windings.

7. A dynamoelectric machine having a stator core portion with a winding and a rotor core portion with a winding and a cooperating commutator, impeller blades rotatable with said commutator and adapted to provide a flow of ventilating medium over said commutator, cooling means for said ventilating medium flow, means including a scroll for directing said ventilating medium flow to and away from said cooling means, means including separate impeller blades rotatable with said commutator for directing cooling medium over said stator and rotor windings, cooling means for said second-mentioned ventilating medium flow, means including at least one scroll for directing said second-mentioned flow of cooling medium over said windings to and away from said second-mentioned cooling means, and means including baffles for directing said ventilating flows to and away from said impeller blades and for preventing intermixing of said two ventilating medium flows.

8. A dynamoelectric machine having a stationary member provided with a winding and a rotatable member provided with a winding and a commutator connected thereto, at least one of said windings comprising organo silicon resin treated insulation, means including ventilating medium impeller blades rotatable with said commutator for directing ventilating medium flow over said commutator, means including additional ventilating medium impeller blades rotatable with said commutator for directing ventilating medium flow over said windings of said stationary member and said rotatable member, means including a stationary baffle adjacent a rotatable spider for separating ventilating medium flow caused by said first-mentioned impeller blades from ventilating medium flow caused by said second-mentioned impeller blades, and means for causing a higher operating pressure throughout the flow of ventilating medium for said commutator than throughout the flow of ventilating medium for said windings, whereby there will be no leakage of ventilating medium used to cool said windings into the ventilating medium used to cool said commutator.

9. A dynamoelectric machine having a stationary frame, a stator core portion attached to said frame, a stator winding arranged about said stator core portion, a rotatable shaft, a rotor core portion rotatable with said shaft, a winding in said rotor core portion, a commutator rotatable with said shaft and attached to said rotor winding, commutator brushes, an enclosure for all of said machine, an organo silicon insulation in the end of said machine opposite said commutator, means including a dual impeller assembly rotatable with said shaft and for providing two distinct ventilating medium flows, means including barriers for separating said ventilating medium flows and confining one of said flows to the commutator end of said machine and the other of said flows to the end of said machine containing said windings, means including a scroll arranged generally around the periphery of said machine and leading from the inner to the outer side of said frame and adapted to direct said commutator end flow from the associated half of said dual impeller assembly through a cooling means and back to said commutator, and means including two scrolls arranged around the periphery of said machine and extending from the inside to the outside of said frame to direct flow from the other half of said dual impeller assembly through cooling means and back to said stator and rotor windings.

WILLIAM E. JACOBSEN.

REFERENCES CITED

The following references are of record in the file of this patent:

UNITED STATES PATENTS

| Number | Name | Date |
|---|---|---|
| 1,906,849 | Fleischmann | May 2, 1933 |
| 2,153,386 | Morey | Apr. 4, 1939 |
| 2,284,656 | Heter | June 2, 1942 |
| 2,399,366 | Lynn | Apr. 30, 1946 |
| 2,414,532 | Johns | Jan. 21, 1947 |

FOREIGN PATENTS

| Number | Country | Date |
|---|---|---|
| 688,844 | France | May 19, 1930 |